(12) United States Patent
Goldston et al.

(10) Patent No.: US 6,556,639 B1
(45) Date of Patent: Apr. 29, 2003

(54) METHOD AND APPARATUS FOR DETERMINING TRANSMISSION MODE AND SYNCHRONIZATION FOR A DIGITAL AUDIO BROADCASTING SIGNAL

(75) Inventors: Don Roy Goldston, Mason, OH (US); Marcus Matherne, West Chester, OH (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/339,363

(22) Filed: Jun. 24, 1999

(51) Int. Cl.$^7$ .................................................. H04L 7/00
(52) U.S. Cl. ...................... 375/365; 370/516; 375/354; 375/355; 375/359; 375/362; 375/366; 375/368
(58) Field of Search .................................. 375/216, 365, 375/354, 355, 359, 366, 368, 362; 370/516

(56) References Cited

U.S. PATENT DOCUMENTS

| | | | |
|---|---|---|---|
| 5,289,476 A | 2/1994 | Johnson et al. | |
| 5,559,830 A | 9/1996 | Dapper et al. | 375/230 |
| 5,588,022 A | 12/1996 | Dapper et al. | 375/216 |
| 5,606,576 A | 2/1997 | Dapper et al. | 375/268 |
| 5,633,896 A | 5/1997 | Carlin et al. | 375/340 |
| 5,673,292 A | 9/1997 | Carlin | 375/269 |
| 5,703,954 A | 12/1997 | Dapper et al. | 381/15 |
| 5,748,686 A | 5/1998 | Langberg et al. | |
| 5,764,706 A | 6/1998 | Carlin et al. | 375/326 |
| 5,809,065 A | 9/1998 | Dapper et al. | 375/216 |
| 5,859,876 A | 1/1999 | Dapper et al. | 375/295 |
| 5,949,796 A | 9/1999 | Kumar | |

FOREIGN PATENT DOCUMENTS

GB      2 320 871 A      7/1998

OTHER PUBLICATIONS

Kroeger, B., Vigil, A., "Improved IBOC DAB Technology For AM and FM Broadcasting", Oct. 1996.
M. Alard, R. Lassale, "Principles of modulation and channel coding for digital broadcasting for mobile receivers", EBU Review, No. 224, pp. 168–190, Aug. 1987.
Kroeger, B.W., Peyla, P.J., "Robust IBOC DAB AM and FM Technology For Digital Audio Broadcasting", Apr. 1997.
Hartup, D. C., Alley, D. M., Goldston, D. R.,"AM Hybrid IBOC DAB System", Sep. 1997.

*Primary Examiner*—Stephen Chin
*Assistant Examiner*—Sam Ahn
(74) *Attorney, Agent, or Firm*—Robert P. Lenart, Esq.; Pietragallo, Bosick & Gordon

(57) ABSTRACT

A method is provided for transmitting control information in a digital audio broadcasting system. The method comprises the steps of transmitting a plurality of control bits in each of a plurality of control frames, wherein a first sequence of the control bits represents a transmission mode, and a second sequence of the control bits represents a control data synchronization word. The plurality of control bits can further include a third sequence of bits representative of an interleaver synchronization word. A method performed in a radio receiver for determining transmission mode and synchronization for a digital audio broadcasting signal is also provided. The method comprises the steps of receiving a plurality of interleaver frames containing digital information, wherein each of the interleaver frames includes a plurality of control frames. The control frames include a plurality of control bits, wherein a first sequence of the control bits represents a transmission mode, and a second sequence of the control bits represents a control data synchronization word. The plurality of control bits can further include a third sequence of bits representative of an interleaver synchronization word. The first sequence of control bits is processed to determine a transmission mode; the second sequence of control bits is processed to determine control data synchronization; and the third sequence of control bits is processed to determine interleaver boundaries. Radio frequency transmitters and receivers that utilize the above methods are also disclosed.

38 Claims, 5 Drawing Sheets

METHOD AND APPARATUS FOR DETERMINING TRANSMISSION MODE AND SYNCHRONIZATION FOR A DIGITAL AUDIO BROADCASTING SIGNAL

BACKGROUND OF THE INVENTION

This invention relates to radio frequency signal transmission and reception and, more particularly, to methods of and apparatus for transmitting and receiving control information in a digital audio broadcasting signal.

There has been increasing interest in the possibility of broadcasting digitally encoded audio signals to provide improved audio fidelity. Several approaches have been suggested. One such approach, set forth in U.S. Pat. No. 5,588,022, which is hereby incorporated by reference, teaches a method for simultaneously broadcasting analog and digital signals in a standard AM broadcasting channel. An amplitude modulated radio frequency signal having a first frequency spectrum is broadcast. The amplitude modulated radio frequency signal includes a first carrier modulated by an analog program signal. Simultaneously, a plurality of digitally modulated carrier signals are broadcast within a bandwidth that encompasses the first frequency spectrum. Each of the digitally modulated carrier signals is modulated by a portion of a digital program signal. A first group of the digitally modulated carrier signals lies within the first frequency spectrum and is modulated in quadrature to the first carrier signal. Second and third groups of the digitally modulated carrier signals lie outside of the first frequency spectrum and are modulated both in-phase and in-quadrature to the first carrier signal.

The waveform in the AM compatible digital audio broadcasting system described in U.S. Pat. No. 5,588,022, was formulated to provide sufficient data throughput for the digital signal while avoiding crosstalk into the analog AM channel. Multiple carriers are employed by means of orthogonal frequency division multiplexing (OFDM) to bear the communicated information.

In an AM compatible digital audio broadcasting system digitally encoded audio information is transmitted simultaneously with the existing analog AM signal. The digital information is encoded and transmitted using OFDM modulation. Digital audio broadcasting systems can transmit the digital information using various audio encoding and forward error correction rates to allow a broadcaster to trade-off audio quality for coverage area and resistance to channel impairments. The receiver must determine which audio encoding rate is being used for transmission in order to reproduce the digitally encoded signal. Additionally, the receiver must be able to properly synchronize to the interleaver frames in order to have proper error correction and digital signal recovery. There is a need for a method of achieving these goals and for ensuring that the control information is accurately received.

SUMMARY OF THE INVENTION

The present invention provides a method for transmitting control information in a digital audio broadcasting system. The method comprises the steps of transmitting a plurality of control bits in each of a plurality of control frames, wherein a first sequence of the control bits represents a transmission mode, and a second sequence of the control bits represents a control data synchronization word. The plurality of control bits can further include a third sequence of bits representative of an interleaver synchronization word.

The invention also provides a method performed in a radio receiver for determining transmission mode and synchronization for a digital audio broadcasting signal. The method comprises the steps of receiving a plurality interleaver frames containing digital information, wherein each of the interleaver frames includes a plurality control frames. The control frames include a plurality of control bits, wherein a first sequence of the control bits represents a transmission mode, and a second sequence of the control bits represents interleaver synchronization word, and a third sequence of the control bits represents a control data synchronization word. The plurality of control bits can further include a third sequence of bits representative of an interleaver synchronization word. The control bits are processed to identify the control bits representing the control data synchronization word.

The invention also encompasses radio frequency transmitters and receivers that utilize the above method.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

This invention provides a method for determining transmission mode and synchronization for a digital audio broadcasting signal. The technique of broadcasting the digital signal in the same channel as an analog AM signal is called in-band on-channel (IBOC) broadcasting. This broadcasting is accomplished by transmitting a digital waveform by way of a plurality of orthogonal frequency division modulated (OFDM) carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least [35 dB+1 dB/kHz] below the unmodulated analog carrier level.

Figure 1:
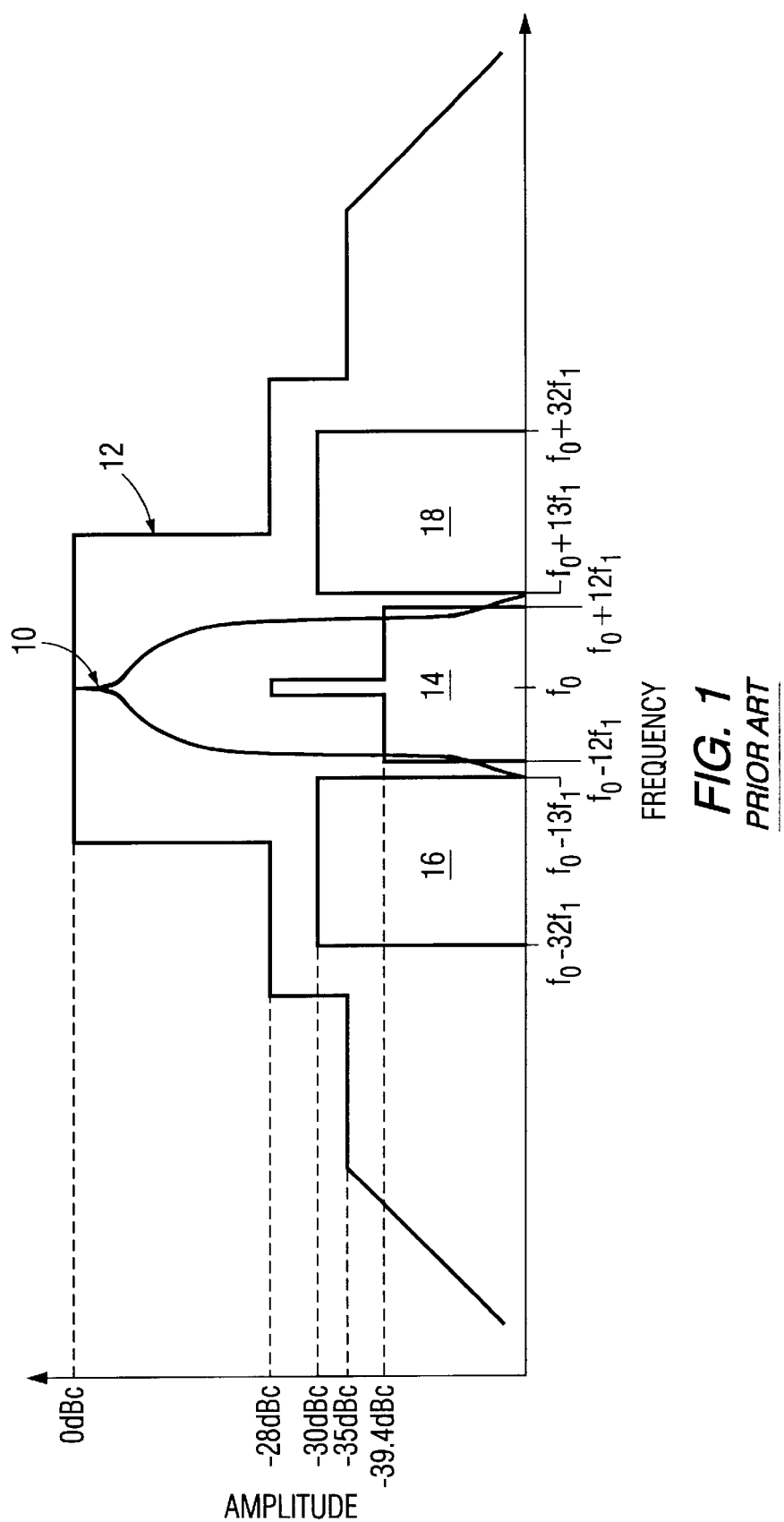
FIG. 1 is a diagrammatic representation of a prior art composite analog AM and digital broadcasting signal which can be utilized when performing the method of the present invention.

FIG. 1 shows the spectrum of an AM digital audio broadcasting signal of a type that can utilize the present invention. Curve 10 represents the magnitude spectrum of a standard broadcasting amplitude modulated signal, wherein the carrier has a frequency of $f_0$. The FCC emissions mask is represented by item number 12. The OFDM waveform is composed of a series of data carriers spaced at $f_1 = 59.535 \cdot 10^6/(131072)$, or about 454 Hz. A first group of twenty four of the digitally modulated carriers are positioned within a frequency band extending from $(f_0-12\,f_1)$ to $(f_0+12\,f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary QPSK, or complementary 32 QAM) and is more fully described in the previously discussed in U.S. Pat. No. 5,859,876. Complementary BPSK modulation is employed on the innermost digital carrier pair at $f_0 \pm f_1$ to transmit control information. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0-11\,f_1)$ to $(f_0-2\,f_1)$ and from $(f_0+2f_1)$ to $(f_0+11\,f_1)$ for the 16 kbps encoding rate. For all three encoding rates, the carriers at $(f_0-12\,f_1)$ and $(f_0+12\,f_1)$ carry supplementary data and may be modulated using complementary 32 QAM.

Additional groups of digital carriers are placed outside the first group. The need for these digital waveforms to be in-quadrature with the analog signal is eliminated by restricting the analog AM signal bandwidth. The carriers in a second and a third group, encompassed by envelopes 16 and 18 respectively, may be modulated using, for example, 32 QAM for the 48 and 32 kbps rates, and 8 PSK for the 16 kbps rate. The carriers are set at levels of −30 dBc for all encoding rates.

Figure 2:
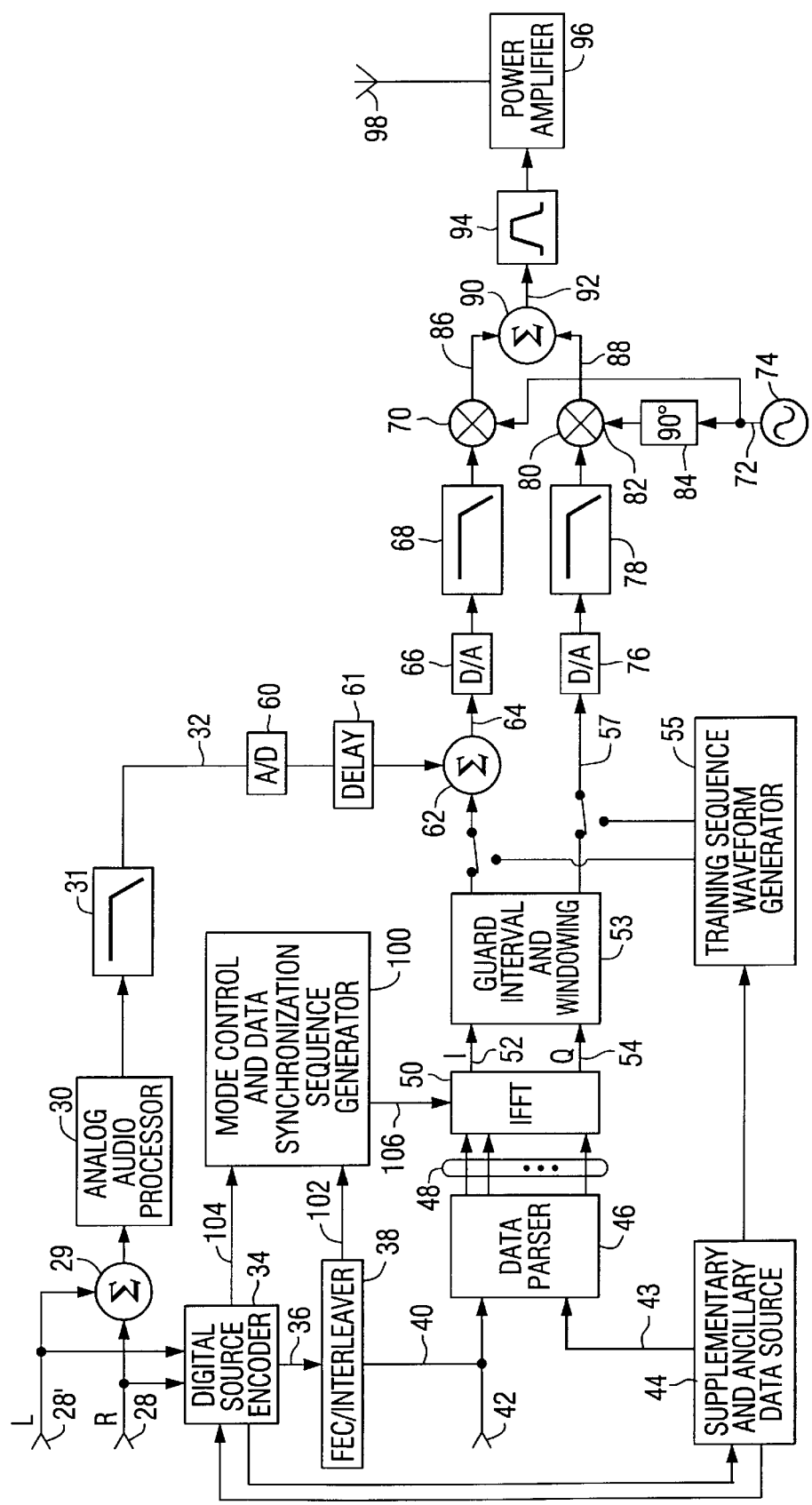
FIG. 2 is a block diagram of a transmitter that can perform the signal processing method of this invention.

FIG. 2 is a block diagram of a transmitter constructed in accordance with this invention. An analog program signal (which in this example includes right and left stereo portions) that is to be transmitted is impressed onto input terminals 28 and 28'. The left and right channels are combined in summation point 29 and then fed through an analog audio processor 30 to increase the average analog AM modulation, which extends the coverage region considerably. Such processors are commonplace at analog AM radio stations throughout the world. That signal is passed through a low pass filter 31 having a sharp cutoff characteristic, to produce a filtered monaural analog program signal on line 32. Filter 31 may, for example, have a cutoff frequency of 5 kHz and 40 dB attenuation beyond 5.5 kHz. Optionally, the effect of filter 31 may be achieved by audio processing within analog audio processor 30.

For those applications in which the analog and digital portions of the transmitted signal will be used to convey the same program material, a digital source encoder 34, which may implement the encoding algorithm, converts the right and left analog program signals to a digital signal on line 36. A forward error correction and interleaver circuit 38 improves data integrity over channels corrupted with impulsive noise and interference, producing a digital signal on line 40. For those instances where the digital signal to be transmitted is not a digital version of the analog program signal, a data port 42 is provided to receive the digital signal.

A supplementary and ancillary data source 44 is also provided for those instances in which the digital version of the analog program signal, or a digital signal supplied to port 42, is to be supplemented by including additional data. A portion of the ancillary data can be input to the digital source encoder 34. The source encoder may reserve a portion of its output bits for the transfer of ancillary data. Also, if the audio source does not require the full encoding rate of the source encoder, for instance during non-complex musical passages, the encoder can, on an as available basis, transmit ancillary data. When the source encoder does not require the full encoding rate and can transmit ancillary information in addition to the reserved ancillary data, the source encoder could indicate this condition to the ancillary data source by sending a signal to the ancillary data source, where the signal indicates the amount of additional data that can be transmitted. Ancillary data could be used to transmit signals such as emergency information, stock market quotes, weather forecasts, or information related to the audio program material such as the title of a song.

Data parser 46 receives the digital data and produces a plurality of outputs on lines 48. Supplementary data that is used on carriers $(f_0-12\,f_1)$ and $(f_0+12\,f_1)$ is input on line 43. The signals on pairs of lines 48 from the data parser 46 constitute complex coefficients that are in turn applied to an Inverse Fast Fourier Transform (IFFT) algorithm in block 50, which generates the baseband in-phase, I, and quadrature, Q, components of the data signal, on lines 52 and 54 respectively. A guard band is applied to the output of the IFFT by processor 53. When the IFFT output consists of 128 samples per IFFT operation, the guard band consists of 7 samples. The guard band is applied by periodically extending the IFFT output, or in other words, taking samples 1 through 7 and replicating them as samples 129 through 135, respectively. Following the guard band, a window is applied to the data. The window reduces interference to second and third adjacent stations by reducing the sidelobes in the transmitted spectrum.

Periodically, instead of transmitting encoded program data or ancillary data, a training sequence, also commonly known as pilot information, which is known data, is sent. The training sequence allows processors in the receiver such as the equalizer to acquire the signal rapidly and follow rapidly changing channel conditions. The training sequence can be stored in, or generated by, device 55 and periodically selected as the transmitted waveform, for example, every tenth frame. Alternatively, information for the training sequence could be stored in the frequency domain and applied to the input of the IFFT. However, storing the information in the time domain reduces the required number of IFFT operations. Although known data is sent every tenth frame, the carriers devoted to the transmission of supplementary data, $(f_0-12\,f_1)$ and $(f_0+12\,f_1)$, may not transmit known data every tenth frame. In this case, the supplementary data to be sent every tenth frame is input to the training sequence waveform generator and the contribution of the carriers devoted to supplementary data is added to the known data. The difference between the supplementary data and ancillary data is that the supplementary data processing is completely independent of the source encoding, FEC, and interleaving operations that are used to process the digitally encoded program information.

The processed baseband analog AM signal is converted to a digital signal by analog-to-digital converter 60 and is delayed by delay device 61. Delay of the analog signal at the transmitter provides time diversity between the analog and digital signals in the channel. Time diversity leads to the opportunity for robust blending between the analog and digital signals. The delayed analog signal is combined with the in-phase portion of the digital DAB waveform at summation point 62 to produce a composite signal on line 64. The composite signal on line 64 is converted to an analog signal by digital-to-analog converter 66, filtered by low pass filter 68, and passed to a mixer 70 where it is multiplied with a radio frequency signal produced on line 72 by a local oscillator 74. The quadrature signal on line 57 is converted to an analog signal by digital-to-analog converter 76 and filtered by low pass filter 78 to produce a filtered signal which is multiplied in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by bandpass filter 94, and the resulting DAB signal is subsequently amplified by a power amplifier 96 for delivery to a transmitting antenna 98.

The system control information is transmitted on the pair of OFDM carriers that are closest in frequency to the AM carrier. These carriers, one located below the AM carrier frequency and one located the same amount in frequency higher than the AM carrier, are modulated using BPSK modulation. The BPSK carriers form a complementary pair, meaning that when the BPSK carriers are summed the resultant is in quadrature to the AM carrier. The BPSK carriers are made complementary by choosing the modulation on one carrier to be the negative conjugate of the modulation on the other carrier. This means that although there are two BPSK carriers, the information on the carriers is not independent and the carriers transmit a total of only 1 bit of control information per OFDM frame. The symbol rate for a preferred embodiment of the AM compatible digital audio broadcasting system is approximately 430.66 bps, meaning that 430.66 bits of system control information are transmitted per second. The carriers closest to the AM carrier frequency are transmitted at a higher power than the other OFDM carriers. Since they are closest to the center of the channel, the equalizer in the receiver has to adapt less for these carriers than for carriers farther from the center of the channel because the reference phase for the digital signal is normalized to the phase at the center of the channel and the magnitude for the digital signal is normalized by the received power of the BPSK carriers. In addition, since the BPSK carriers are complementary, there is an increase in signal-to-noise ratio that results because the carriers are combined at the receiver. Furthermore, the carriers that are closest to the center of the channel are least sensitive to errors in the symbol timing, or baud recovery, circuits. These factors combine to make the control information very robust.

Further in accordance with the invention, as shown in FIG. 2, the control bits are generated by mode control and data synchronization sequence generator 100. This generator may consist of a memory device that stores the sequence. A signal on line 102 from the FEC and interleaver processor 38 is used to synchronize the mode control and data synchronization sequence to the retrieval of data from the interleaver. The digital source encoder sends a signal on line 104 to the mode control and data synchronization sequence generator to convey the audio encoding rate that is currently being used. The mode control and data synchronization sequence is provided to the IFFT on line 106. The IFFT uses the data on line 106 as the input for the digital carriers that convey the mode control and data synchronization sequence.

In one preferred embodiment, the FEC and interleaver processor consists of an outer FEC code, followed by an outer interleaver, followed by an inner FEC code, followed by an inner interleaver. The length of the mode control and data synchronization sequence can be set such that the sequence provides data for a number of baud that equals the number of baud that can be transmitted using the data in the inner interleaver. At the receiver, this allows the boundaries of the inner interleaver to be determined by appropriate processing of the mode control and data synchronization sequence.

Figure 5:
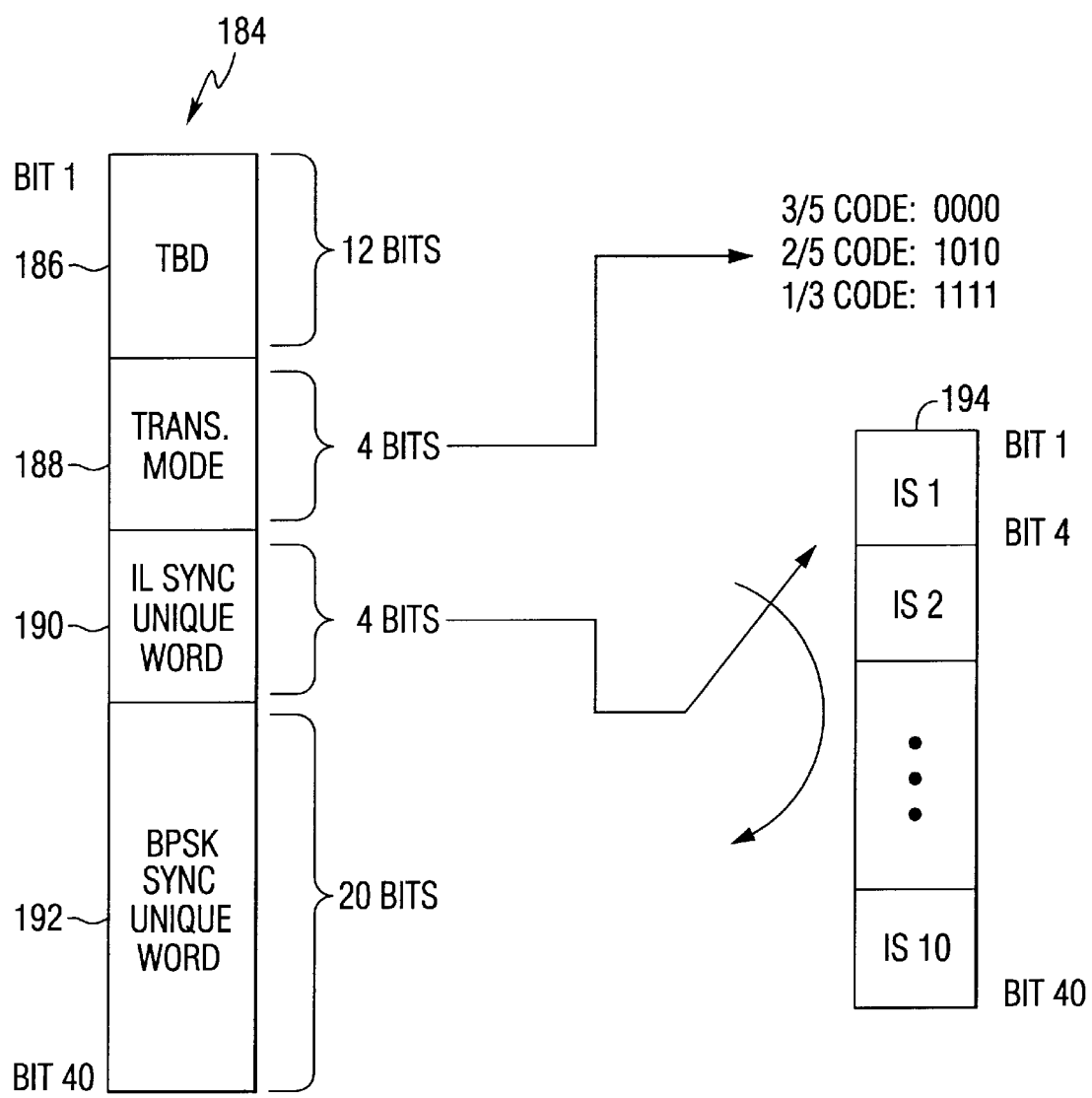
FIG. 5 is a schematic representation of a control frame of data that can be processed in accordance with this invention.

In one preferred embodiment, there are 400 OFDM frames transmitted per inner interleaver frame, where an inner interleaver frame refers to the data needed to fill the inner interleaver. Since one bit of control information is transmitted per OFDM frame, there are 400 bits of control information transmitted per interleaver frame. Therefore, if the mode control and data synchronization sequence has a length of 400 bits, the sequence will repeat every inner interleaver frame. These 400 bits are divided into 10 segments of 40 bits, where each segment of 40 bits is called a control frame. The format of the 40 bits comprising a control frame 184 is shown in FIG. 5.

Figure 3:
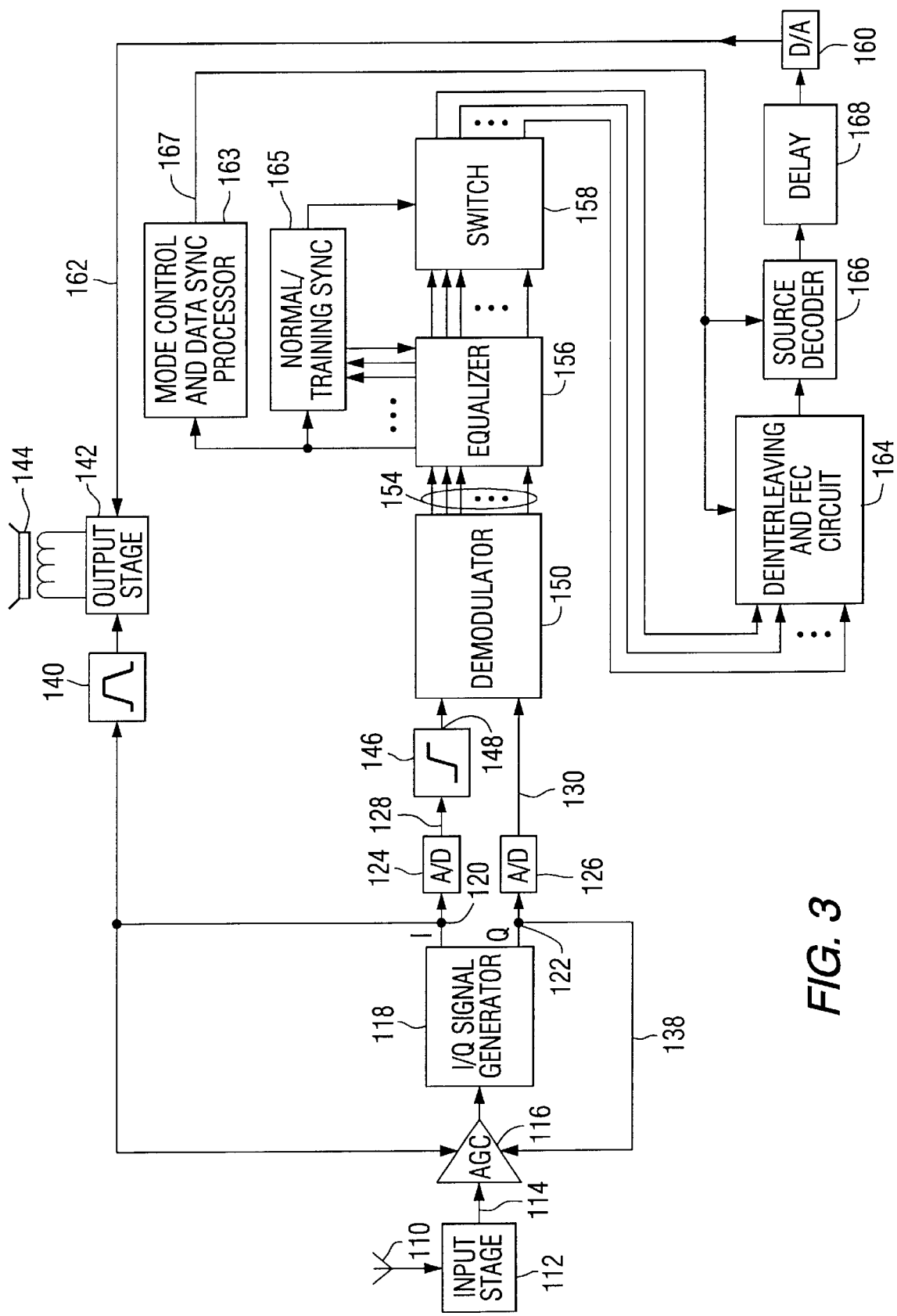
FIG. 3 is a block diagram of a receiver that can perform the signal processing method of this invention.

FIG. 3 is a block diagram of a receiver constructed to receive the composite digital and analog signals of FIG. 1. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The in-phase channel output on line 120 is input to an analog-to-digital converter 124. Similarly, the quadrature channel output on line 122 is input to another analog-to-digital converter 126. Feedback signals on lines 120 and 122 are used to control the automatic gain control circuit 116. The signal on line 120 includes the analog AM signal which is separated out as illustrated by block 140 and passed to an output stage 142 and subsequently to a speaker 144 or other output device.

An optional highpass filter 146 may be used to filter the in-phase components on line 128 to eliminate the energy of the analog AM signal and to provide a filtered signal on line 148. If the highpass filter is not used, the signal on line 148 is the same as that on line 128. A demodulator 150 receives the digital signals on lines 148 and 130, and produces output signals on lines 154. These output signals are passed to an equalizer 156, and the equalizer output is passed to a switch 158. The output of the switch is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align analog and digital signals at the receiver. The output of delay circuit 168 is converted to an analog signal by a digital-to-analog converter 160 to produce a signal on 162 which goes to the output stage 142.

Figure 4:
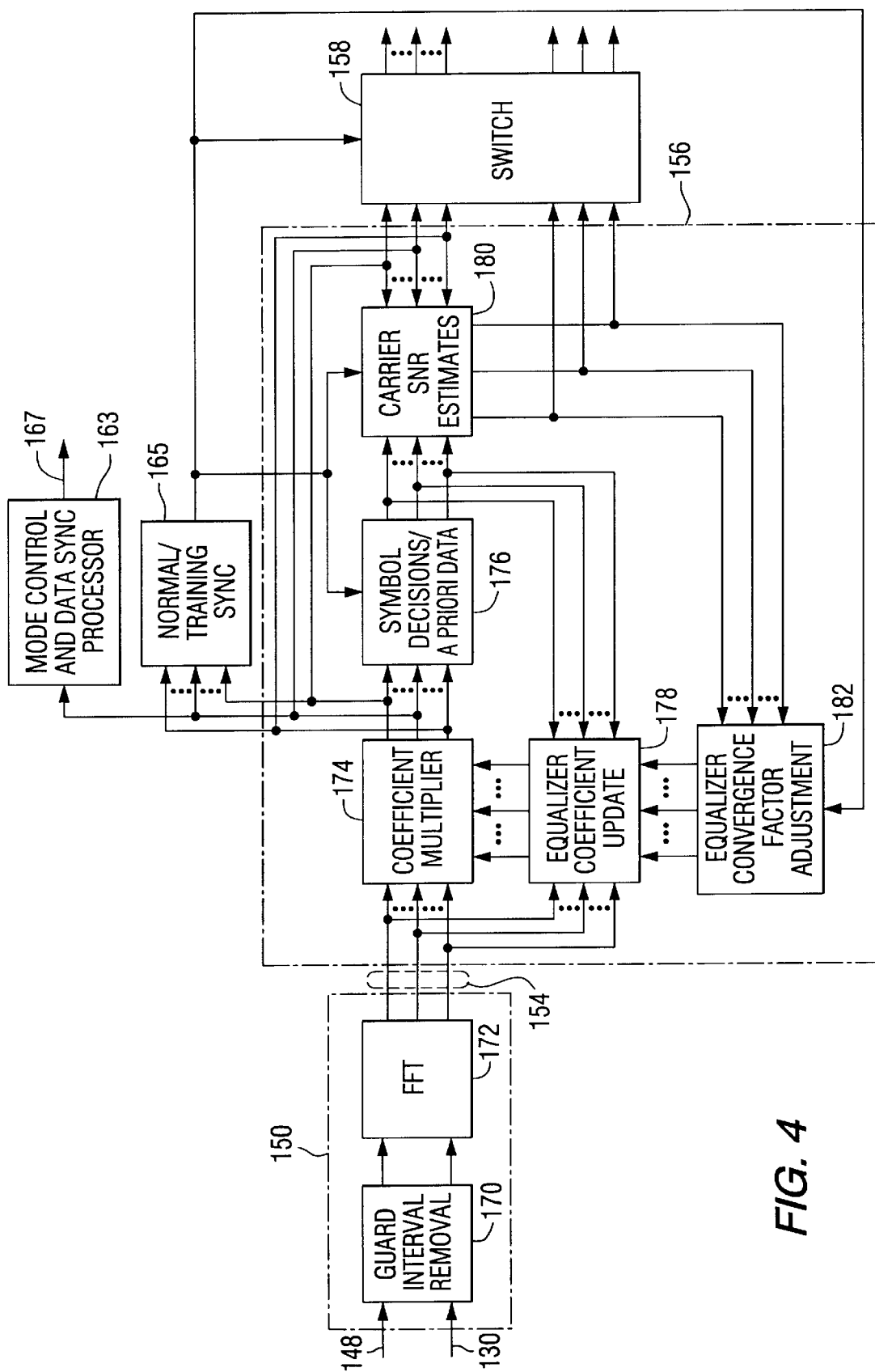
FIG. 4 is a more detailed block diagram of a portion of the receiver of FIG. 3.

FIG. 4 is a more detailed functional block diagram that further illustrates the operation of the invention. Both in-phase (I) and quadrature (Q) signals are provided on lines 148 and 130 as inputs to a windowing and guard interval removal circuit 170. These signals may be provided by using down converter elements similar to those shown in FIG. 3.

The window should be applied such that the digital carriers remain orthogonal, or at least the lack of orthogonality among the digital carriers is small enough not to impact system performance. The I and Q signals are synchronized to the transmitted baud intervals and each baud is input to an FFT circuit 172. In some cases it may be advantageous to perform the windowing and guard band removal operations prior to processing by highpass filter 146. The outputs from the windowing and guard interval removal circuit 170 are input to the FFT 172. To obtain higher signal-to-noise ratios (SNR) for the complementary carriers, the FFT outputs for pairs of complementary carriers are combined. The output of the FFT is input by way of lines 154 to the coefficient multiplier 174. The coefficient multiplier adjusts the magnitude and phase of the data for each digital carrier to compensate for channel effects, transmitter and receiver filtering, and other factors that can affect the magnitude and phase of the received digital information. The coefficient multiplier output is used to make symbol decisions, which determines the constellation point that was transmitted. Processor 176 determines which of the frequency domain constellation points was transmitted. These decisions, along with the pre-equalized constellation points and the previous values of the equalizer coefficients are used to update the equalizer coefficients as illustrated by block 178. Block 178 can utilize a known algorithm such as the least mean squares (LMS) or recursive least squares (RLS) to update the equalizer coefficients.

In order to properly demodulate the data, the receiver must identify when training baud are received. When a training baud is received, the output of the equalizer is not input to the symbol decision processors (including FEC and deinterleavers) because the training baud information is not used to obtain the digitally encoded audio program. Also, the equalizer uses a different convergence factor, or adaptation constant when a training frame is received. Additionally, the data that is input to the noise power estimate is processed differently when a training baud is received. Also, the symbol decisions/a priori data block 176 outputs the ideal data corresponding to the training baud when a training baud is received and the symbol decisions when a normal baud is received. As shown in FIG. 4, the coefficient multiplier output is input to a processor 165 that determines normal training synchronization.

As shown in FIGS. 3 and 4, the data stream from the coefficient multiplier is input to mode control and data synchronization processor 163. This processor uses only the data from the mode control and data synchronization sequence. Mode control and data synchronization processor 163 processes the control information and determines the audio encoding rate and the boundaries of the inner interleaver. A signal is sent on line 167 to the deinterleaving and FEC circuit 164 to indicate the boundaries of the inner interleaver. This results in synchronization of the data at the receiver with respect to the inner interleaver boundaries and allows proper operation of the deinterleaving and FEC circuit 164. A signal is also sent to indicate to the source decoder the rate of the encoded audio information.

This invention provides a transmission format and reception method for system control information in an AM compatible digital audio broadcasting system. The transmitted data includes transmission mode, interleaver synchronization, and control data synchronization information. In the preferred embodiment of the invention, the information is transmitted on the OFDM carriers that are closest to the AM carrier. BPSK modulation format is used to provide robust performance in the presence of noise and interference. The synchronization sequences discussed below have been chosen to result in low autocorrelation sidelobe levels.

FIG. 5 illustrates an entire control frame 184. As shown in FIG. 5, the first 12 bits 186 are to-be-determined and can be used as needed for future system upgrades. The next 4 bits 188 are the transmission mode information bits. These bits indicate the audio encoding rate and the forward error correction rate used in the convolutional encoder. In the currently preferred embodiment of an AM digital audio broadcasting system, there are 3 modes defined for transmission, including audio encoding at 48 kbps with a 3/5 rate for the convolutional encoder, audio encoding at 32 kbps with a 2/5 rate for the convolutional encoder, and audio encoding at 16 kbps with a 1/3 rate for the convolutional encoder. The 4 transmission mode information bit codes were chosen to have the maximum number of different bits.

At the receiver, the transmission mode information is not required until a complete interleaver frame is received. Therefore, it is advantageous for the receiver to use the information from the 10 control frames in the interleaver to determine the transmission mode. One method of determining the transmission mode would be to count the number of transmission mode bits that are received as a 1. With the bit codes illustrated in FIG. 5, the bits should sum to 0, 20, and 40 for the 3/5 code, 2/5 code, and 1/3 codes, respectively. The ideal value closest to the summed value can be used to determine which mode is being transmitted. Simulation of this algorithm for determining the transmission mode has shown it to be practical and reliable because if the mode bits from the BPSK carriers cannot be recovered, it is highly unlikely that the data for the other carriers, which use more complex modulation formats, can be recovered. Alternatively, the transmission mode bits could be correlated with all possible transmission mode codes. The correlation producing the largest output would be chosen as the transmission mode. The result of the correlation could be lowpass filtered and hysteresis could be added to reduce the effects of noise. The correlation could be implemented as a negated exclusive or (XOR) of the received bits with the possible transmission mode codes. The bits resulting from the negated XOR operation for each transmission mode code could be summed to represent the correlation value.

The next four bits 190 are part of the 40 bits that comprise the interleaver synchronization word 194. The 40 bit interleaver synchronization word is transmitted once per interleaver frame, with 4 of the bits transmitted during each of the 10 control frames that are transmitted during each interleaver frame. The receiver processes the interleaver synchronization information to determine interleaver frame boundaries. The interleaver unique word was chosen to have a high peak-to-sidelobe autocorrelation in order to permit reliable determination of interleaver boundaries. Specifically, the bit pattern used is 1 1 0 0 1 1 1 0 1 0 1 1 1 0 0 0 1 0 1 1 1 1 0 1 0 1 0 0 1 0 0 0 0 0 1 0 0 1 0 0, which has an autocorrelation of 40 when the sequence is aligned and a peak sidelobe level of +/−4 when the sequence is not aligned. Note that the autocorrelation is obtained by correlating the sequence over a periodic extension of itself and these numbers are obtained by using a 1 for a 1 bit and a −1 for a 0 bit. As the interleaver frame is processed by the receiver, the entire interleaver synchronization word can be assembled, by combining the four bit sequences in each of the ten control frames. The received interleaver synchronization word can be correlated with the known transmitted interleaver word to find the interleaver boundaries. Specifically, each time a full control frame is received, the last 40 received interleaver synchronization bits received can be correlated with the known pattern. The result of the correlation can be compared to a threshold to determine interleaver synchronization.

To achieve proper correlation, the synchronization for the BPSK control frame must first be achieved. As shown in FIG. 5, the last 20 bits 192 of a control frame consist of a BPSK synchronization unique word. The purpose of this sequence of bits is to allow the receiver to synchronize to the bit pattern of the control frame so that it can choose the proper bits for the transmission mode and interleaver synchronization information. Like the interleaver synchronization word, this word was chosen to have a high peak-to-sidelobe autocorrelation. Specifically, the bit pattern used is 1 1 1 1 1 0 1 1 0 0 1 0 1 0 1 1 0 0 0 1, which has an autocorrelation of 20 when the sequence is aligned and a peak sidelobe level of +/−4 when the sequence is not aligned. The known transmitted pattern for these bits can be used to correlate the received control word bit pattern at the receiver. Because the other 20 bits of the control word could occasionally produce a high correlation with the BPSK synchronization unique word and to reduce the effects of noise, it may be advantageous to individually low pass filter the correlation output for each of the possible correlation positions within a control frame. The output of the lowpass filters, or of the correlations if a lowpass filter is not used, can be compared to a threshold to determine when BPSK synchronization is achieved.

This invention provides a method and apparatus for transmitting and receiving control information in an amplitude modulated compatible digital audio broadcast signal. In the foregoing specification certain preferred practices and embodiments of this invention have been set out, however, it will be understood that the invention may be otherwise embodied within the scope of the following claims.

What is claimed is:

1. A method for transmitting control information in a digital audio broadcasting system, said method comprising the steps of:

interleaving a plurality of frames of digital information to form an interleaver frame;

each of the frames of digital information including a single control bit, wherein a plurality of the control bits are arranged in a plurality of control frames, a first sequence of said control bits representing a transmission mode and a second sequence of said control bits representing a control data synchronization word; and transmitting a plurality of the interleaver frames.

2. The method of claim 1, wherein said control bits are transmitted via two complementary carriers located adjacent to an analog AM carrier in a digital audio broadcast signal.

3. The method of claim 2, wherein said complementary carriers are orthogonal frequency division multiplex carriers.

4. The method of claim 2, wherein said complementary carriers are modulated using binary phase shift keying.

5. The method of claim 1, wherein said plurality of control bits further comprises a third sequence of control bits representative of an interleaver synchronization word.

6. The method of claim 1, further comprising the step of:
   transmitting a third sequence of said control bits representing an interleaver synchronization word.

7. A method for determining transmission mode and synchronization for a digital audio broadcasting signal, said method comprising the steps of:

receiving a plurality of interleaver frames containing a plurality of frames of digital information, each of said interleaver frames including a plurality of control frames, said control frames including a plurality of control bits wherein each of the plurality of frames of digital information includes a signal one of the control bits, a first sequence of said control bits representing a transmission mode and a second sequence of said control bits representing a control data synchronization word; and processing said plurality of control bits to identify said control bits representing said control data synchronization word.

8. The method of claim 7, wherein the step of processing said plurality of control bits to identify said control bits representing said control data synchronization word comprises the steps of:

correlating bits of said plurality of control bits with a predetermined data word representative of said control sequence of bits; and comparing the results of the correlating step with a predetermined threshold.

9. The method of claim 8, further comprising the step of:
   filtering the results of the correlating step for a plurality of possible positions of the control data synchronization word bits within said control frame prior to the step of comparing the results of the correlating step with a predetermined threshold.

10. The method of claim 7, further comprising the steps of:

summing the control bits in said first sequence for one of said interleaver frames to produce a summed value;

comparing said summed value to one of a plurality of predetermined values representative of a plurality of transmission modes; and selecting a transmission mode corresponding to the predetermined value that is closest to the summed value.

11. The method of claim 7, further comprising the steps of:

correlating the control bits of said first sequence of control bits with a plurality of predetermined sequences of transmission mode bits; and using the results of the correlating step to determine the transmission mode.

12. The method of claim 7, further comprising the steps of:

combining said second sequence of control bits for one of said interleaver frames to produce a control data synchronization word; and correlating said control data synchronization word with a predetermined control data word.

13. The method of claim 7, further comprising the step of:
    transmitting a third sequence of said control bits representing an interleaver synchronization word.

14. An apparatus for transmitting control information in a digital audio broadcasting system, said apparatus comprising:

means for generating a plurality of control bits in each of a plurality of control frames, a first sequence of said control bits representing a transmission mode and a second sequence of said control bits representing a control data synchronization word;

means for interleaving a plurality of frames of digital information to form a plurality of interleaver frames, wherein each of the frames of digital information includes a single control bit of the plurality of control bits; and means for transmitting the plurality of interleaver frames, each of said interleaver frames including a plurality of said control frames.

15. The apparatus of claim 14, further comprising:
means for modulating a complementary pair of sub-carriers in a digital audio broadcast signal with said control bits; and
means for transmitting the complementary pair of sub-carriers.

16. The apparatus of claim 15, wherein said control bits are transmitted via two complementary carriers located adjacent to an analog AM carrier in a digital audio broadcast signal.

17. The apparatus of claim 16, wherein said complementary carriers are orthogonal frequency division multiplex carriers.

18. The apparatus of claim 16, wherein said complementary carriers are modulated
using binary phase shift keying.

19. The apparatus of claim 14, wherein said plurality of control bits further comprises a third sequence of control bits representative of an interleaver synchronization word.

20. The apparatus of claim 14, wherein said plurality of control bits further comprises:
a third sequence of said control bits representing an interleaver synchronization word.

21. An apparatus for determining transmission mode and synchronization for a digital audio broadcasting signal, said apparatus comprising:
means for receiving a plurality of interleaver frames containing a plurality of frames of digital information, each of said plurality of frames of digital information including a single control bit in one of a plurality of control frames, said control frames including a first sequence of said control bits representing a transmission mode and a second sequence of said control bits representing a control data synchronization word; and
means for processing said plurality of control bits to identify said control bits representing said control data synchronization word.

22. The apparatus of claim 21, wherein the means for processing said plurality of control bits to identify said control bits representing said control data synchronization word comprises:
means for correlating bits of said plurality of control bits with a predetermined data word representative of said control sequence of bits to produce a correlation result; and
means for comparing the correlation result with a predetermined threshold.

23. The apparatus of claim 22, further comprising:
means for filtering the correlation result for a plurality of possible positions of the control data synchronization word bits within said control frame prior to comparing the correlation result with a predetermined threshold.

24. The apparatus of claim 21, wherein said plurality of control bits further includes a third sequence of control bits representative of an interleaver synchronization word, said apparatus further comprising:
means for summing the control bits in said first sequence for one of said interleaver frames to produce a summed value;
means for comparing said summed value to one of a plurality of predetermined values representative of a plurality of transmission modes; and means for selecting a transmission mode corresponding to the predetermined value that is closest to the summed value.

25. The apparatus of claim 21, further comprising:
means for correlating the control bits of said first sequence of control bits with a plurality of predetermined sequences of transmission mode bits to produce a correlation result; and
means for using the correlation result to determine the transmission mode.

26. The apparatus of claim 21, wherein said plurality of control bits further includes a third sequence of control bits representative of an interleaver synchronization word, said apparatus further comprising:
means for combining said second sequence of control bits for one of said interleaver frames to produce an interleaver synchronization word;
means for correlating said interleaver synchronization word with a predetermined interleaver word to produce a correlation result; and
means for comparing results of said correlation result with a predetermined interleaver threshold.

27. The apparatus of claim 21, wherein said plurality of control bits further comprises:
a third sequence of said control bits representing an interleaver synchronization word.

28. An apparatus for transmitting control information in a digital audio broadcasting system, said apparatus comprising:
a waveform generator for generating a plurality of control bits in each of a plurality of control frames, a first sequence of said control bits representing a transmission mode, and a second sequence of said control bits representing a control data synchronization word;
means for interleaving a plurality of frames of digital information to form a plurality of interleaver frames, wherein each of the frames of digital information includes a single control bit of the plurality of control bits; and
means for transmitting the plurality of interleaver frames, each of said interleaver frames including a plurality of said control frames.

29. The apparatus of claim 28, further comprising:
a modulator for modulating a complementary pair of sub-carriers in a digital audio broadcast signal with said control bits; and
an antenna for transmitting the complementary pair of sub-carriers.

30. The apparatus of claim 28, wherein said complementary sub-carriers are located adjacent to an analog AM carrier in a digital audio broadcast signal.

31. The apparatus of claim 28, wherein said plurality of control bits further includes a third sequence of said control bits representing interleaver synchronization word.

32. The apparatus of claim 28, wherein said complementary pair of sub-carriers are modulated using binary phase shift keying.

33. An apparatus for determining transmission mode and synchronization for a digital audio broadcasting signal, said apparatus comprises:
a demodulator for demodulating a digital audio broadcasting signal to retrieve a plurality interleaver frames containing a plurality of frames of digital information, each of said interleaver frames including a plurality of control frames, said control frames including a plurality of control bits wherein each of the plurality of frames of digital information includes a signal one of the control bits, a first sequence of said control bits representing a transmission mode, and a second sequence of said control bits representing a control data synchronization word; and a processor for processing said plurality of control bits to identify said control bits representing said control data synchronization word.

34. The apparatus of claim 33, wherein said interleaver frames further comprises:

a third sequence of said control bits representative of an interleaver synchronization word.

35. A system for transmitting and receiving digital audio broadcasting control information, said system comprising:

a transmitter including a waveform generator for generating a plurality of control bits in each of a plurality of control frames, a first sequence of said control bits representing a transmission mode, and a second sequence of said control bits representing a control data synchronization word; means for interleaving a plurality of frames of digital information to form a plurality of interleaver frames, wherein each of the frames of digital information includes a single control bit of the plurality of control bits; and means for transmitting a plurality of interleaver frames, each of said interleaver frames including a plurality of said control frames; and a receiver including a demodulator for demodulating a digital audio broadcasting signal to retrieve the plurality of control bits; and a processor for processing said plurality of control bits to identify said control bits representing said control data synchronization word.

36. A method for transmitting and receiving digital audio broadcasting control information, said method comprising the steps of:

generating a plurality of control bits in each of a plurality of control frame a first sequence of said control bits representing a transmission mode, and a second sequence of said control bits representing a control data synchronization word;

interleaving a plurality of frames of digital information to form a plurality of interleaver frames, wherein each of the frames of digital information includes a single control bit of the plurality of control bits; and transmitting a plurality of interleaver frames, each of said interleaver frames including a plurality of said control frames;

demodulating a digital audio broadcasting signal to retrieve said plurality of control bits; and processing said plurality of control bits to identify said control bits representing said control data synchronization word.

37. A method for determining transmission mode and synchronization for a digital audio broadcasting signal, said method comprising the steps of:

receiving a plurality of interleaver frames containing digital information, each of said interleaver frames including a plurality of control frames, said control frames including a plurality of control bits, a first sequence of said control bits representing a transmission mode and a second sequence of said control bits representing a control data synchronization word;

processing said plurality of control bits to identify said control bits representing said control data synchronization word;

summing the control bits in said first sequence for one of said interleaver frames to produce a summed value;

comparing said summed value to one of a plurality of predetermined values representative of a plurality of transmission modes; and selecting a transmission mode corresponding to the predetermined value that is closest to the summed value.

38. An apparatus for determining transmission mode and synchronization for a digital audio broadcasting signal, said apparatus comprises:

means for receiving a plurality of interleaver frames containing digital information, each of said interleaver frames including a plurality of control frames, said control frames including a plurality of control bits, a first sequence of said control bits representing a transmission mode and a second sequence of said control bits representing a control data synchronization word;

means for processing said plurality of control bits to identify said control bits representing said control data synchronization word;

wherein said plurality of control bits further includes a third sequence of control bits representative of an interleaver synchronization word;

means for summing the control bits in said first sequence for one of said interleaver frames to produce a summed value;

means for comparing said summed value to one of a plurality of predetermined values representative of a plurality of transmission modes; and means for selecting a transmission mode corresponding to the predetermined value that is closest to the summed value.

* * * * *

UNITED STATES PATENT AND TRADEMARK OFFICE
CERTIFICATE OF CORRECTION

PATENT NO. : 6,556,639 B1
DATED : April 29, 2003
INVENTOR(S) : Don Roy Goldston and Marcus Matherne It is certified that error appears in the above-identified patent and that said Letters Patent is hereby corrected as shown below:

Column 2,
Line 7, "The control frames include a plurality of control bits, wherein a first sequence of the control bits represents a transmission mode, and a second sequence of the control bits represents interleaver sychronization word, and a third sequence of the control bits represents a control data synchronization word." should read -- The control frames include a plurality of control bits, wherein a first sequence of the control bits represents a transmission mode, and a second sequence of the control bits represents a control data synchronization word. --

Column 13,
Line 38, "frame a" should read -- frames, a --.

Signed and Sealed this

Seventh Day of September, 2004

JON W. DUDAS
*Director of the United States Patent and Trademark Office*